(12) United States Patent
Koo et al.

(10) Patent No.: US 9,894,955 B2
(45) Date of Patent: Feb. 20, 2018

(54) SHOE HAVING INDIVIDUAL PARTICLES BONDED TO ITS BOTTOM SURFACE

(71) Applicant: Dynasty Footwear, Ltd., El Segundo, CA (US)

(72) Inventors: John C. S. Koo, Los Angeles, CA (US); Jonathan Goldberg, Los Angeles, CA (US); Anthony Cox, Kowloon (CN)

(73) Assignee: Dynasty Footwear, Ltd., El Segundo, CA (US)

( * ) Notice: Subject to any disclaimer, the term of this patent is extended or adjusted under 35 U.S.C. 154(b) by 647 days.

(21) Appl. No.: 14/093,706

(22) Filed: Dec. 2, 2013

(65) Prior Publication Data

US 2014/0096414 A1    Apr. 10, 2014

Related U.S. Application Data

(60) Continuation-in-part of application No. 13/733,974, filed on Jan. 4, 2013, now Pat. No. 8,608,996, which
(Continued)

(51) Int. Cl.
*A43B 13/02*    (2006.01)
*A43B 1/02*    (2006.01)
(Continued)

(52) U.S. Cl.
CPC .............. *A43B 1/02* (2013.01); *A43B 13/02* (2013.01); *A43B 13/12* (2013.01); *A43B 13/122* (2013.01); *A43B 13/22* (2013.01); *A43B 13/223* (2013.01); *B29C 43/28* (2013.01); *B29C 43/305* (2013.01); *B29C 47/0019* (2013.01); *B29C 43/46* (2013.01); *B29C 47/025* (2013.01);
(Continued)

(58) Field of Classification Search
CPC ........... A43B 1/02; A43B 13/02; A43B 13/12; A43B 13/122; A43B 13/22
USPC ...... 36/59 R, 59 C, 8.1, 7.7, 7.1 R, 7.6, 113, 36/132, 136
See application file for complete search history.

(56) References Cited

U.S. PATENT DOCUMENTS 123,450 A    2/1872    Bryant
140,241 A    6/1873    Bryant
(Continued)

FOREIGN PATENT DOCUMENTS

CN    98234514    6/1998
EP    0516874 A1    12/1992
(Continued)

OTHER PUBLICATIONS

"Extrusion", definition from Wikipedia, printed out from http://en.wikipedia.org/wiki/Extrusion on May 16, 2007.
(Continued)

*Primary Examiner* — Ted Kavanaugh
(74) *Attorney, Agent, or Firm* — Joseph G. Swan, P.C.

(57) ABSTRACT

Provided is a shoe that includes: a bottom surface that is adjacent to the ground in normal use; a sole that forms at least a portion of the bottom surface; an upper portion extending above the sole; and individual particles bonded to the bottom surface of the shoe. The individual particles include at least one of corn husk, hemp or a natural plant material that has been ground into the individual particles.

10 Claims, 10 Drawing Sheets

Related U.S. Application Data is a continuation of application No. 12/686,237, filed on Jan. 12, 2010, now Pat. No. 8,414,810, which is a division of application No. 12/050,887, filed on Mar. 18, 2008, now Pat. No. 7,713,457, application No. 14/093,706, which is a continuation-in-part of application No. 13/295,360, filed on Nov. 14, 2011, now Pat. No. 9,049,900, which is a continuation-in-part of application No. 12/604,511, filed on Oct. 23, 2009, now Pat. No. 8,591,790, which is a division of application No. 11/684,311, filed on Mar. 9, 2007, now Pat. No. 7,700,021, which is a division of application No. 10/630,032, filed on Jul. 30, 2003, now Pat. No. 7,203,985, application No. 14/093,706, which is a continuation-in-part of application No. 14/064,131, filed on Oct. 26, 2013, which is a continuation-in-part of application No. 11/530,419, filed on Sep. 8, 2006, now Pat. No. 8,661,713, and a continuation-in-part of application No. 10/613,741, filed on Jul. 3, 2003, now Pat. No. 9,078,492, which is a continuation-in-part of application No. 10/438,375, filed on May 15, 2003, now Pat. No. 7,191,549, said application No. 14/064,131 is a continuation-in-part of application No. 13/543,858, filed on Jul. 8, 2012, now abandoned, which is a continuation of application No. 12/898,550, filed on Oct. 5, 2010, now Pat. No. 8,234,736, which is a division of application No. 12/408,702, filed on Mar. 22, 2009, now Pat. No. 7,827,640, which is a division of application No. 11/751,581, filed on May 21, 2007, now Pat. No. 7,516,506.

(60) Provisional application No. 60/896,315, filed on Mar. 22, 2007, provisional application No. 60/400,322, filed on Jul. 31, 2002, provisional application No. 60/745,926, filed on Apr. 28, 2006, provisional application No. 60/803,351, filed on May 26, 2006, provisional application No. 60/460,260, filed on Apr. 3, 2003.

(51) Int. Cl.

| | | |
|---|---|---|
| *A43B 13/22* | (2006.01) | |
| *B29C 47/00* | (2006.01) | |
| *B29C 43/28* | (2006.01) | |
| *B29C 43/30* | (2006.01) | |
| *A43B 13/12* | (2006.01) | |
| *B29L 31/50* | (2006.01) | |
| *B29C 47/02* | (2006.01) | |
| *B29C 43/46* | (2006.01) | |
| *B29C 43/02* | (2006.01) | |
| *B29K 105/08* | (2006.01) | |
| *B32B 37/04* | (2006.01) | |

(52) U.S. Cl.
CPC ...... *B29C 2043/023* (2013.01); *B29K 2105/0854* (2013.01); *B29L 2031/504* (2013.01); *B32B 37/04* (2013.01)

(56) References Cited

U.S. PATENT DOCUMENTS

| | | |
|---|---|---|
| 384,483 A | 6/1888 | Walters |
| 1,395,958 A | 11/1921 | Hamilton |
| 1,716,790 A | 6/1929 | Mitchell |
| 1,782,382 A * | 11/1930 | Eggers ............... 162/6 |
| 1,811,803 A | 6/1931 | Oakley |
| 1,978,030 A | 10/1934 | Ritchie |
| 1,989,467 A | 1/1935 | Schaffer |
| 2,075,229 A | 3/1937 | Rose |
| 2,121,678 A | 6/1938 | Armor |
| 2,250,987 A | 7/1941 | Dunbar |
| 2,287,282 A | 6/1942 | Tousley |
| 2,371,689 A | 11/1942 | Gregg et al. |
| 2,333,303 A | 11/1943 | Enos |
| 2,362,378 A | 11/1944 | Holbrook et al. |
| 2,393,433 A | 1/1946 | V'Soske |
| 2,393,434 A | 1/1946 | V'Soske |
| 2,400,487 A | 5/1946 | Clark |
| 2,426,524 A | 8/1947 | Rosenbarger |
| 2,427,882 A | 9/1947 | Schulte |
| 2,550,354 A | 4/1951 | Jacobsen |
| 2,570,949 A | 10/1951 | Hoffenberg |
| 2,640,283 A | 6/1953 | McCord |
| 2,663,097 A | 12/1953 | Giese |
| 2,732,065 A | 1/1956 | Marchese |
| 2,736,926 A | 3/1956 | Johnson |
| 2,793,136 A | 5/1957 | Root |
| 2,850,214 A | 9/1958 | Rooney, Jr. |
| 3,007,205 A | 11/1961 | House |
| 3,027,661 A | 4/1962 | McCord |
| 3,303,250 A | 2/1967 | Bingham, Jr. |
| 3,543,420 A | 12/1970 | Dassler |
| 3,555,697 A | 1/1971 | Dassler |
| 3,629,051 A | 12/1971 | Mitchell |
| 3,698,357 A | 10/1972 | Spencer |
| 3,776,753 A | 12/1973 | Habib |
| 3,798,048 A | 3/1974 | Brody et al. |
| 3,824,715 A | 7/1974 | Vaughan et al. |
| 3,888,026 A | 6/1975 | Dassler |
| 3,918,181 A | 11/1975 | Inohara |
| 4,007,549 A | 2/1977 | Moore |
| 4,021,860 A | 5/1977 | Swallow et al. |
| 4,055,699 A | 10/1977 | Hsiung |
| 4,089,069 A | 5/1978 | Vistins |
| 4,108,452 A | 8/1978 | Baron |
| 4,151,662 A | 5/1979 | Vistins |
| 4,160,331 A | 7/1979 | Bell |
| 4,172,293 A | 10/1979 | Vistins |
| 4,217,704 A | 8/1980 | Whitaker |
| 4,250,306 A | 2/1981 | Lask et al. |
| 4,345,702 A | 8/1982 | Wolfe |
| 4,356,643 A | 11/1982 | Kester et al. |
| 4,374,460 A | 2/1983 | Towsend |
| 4,405,730 A | 9/1983 | Cohen |
| 4,489,510 A | 12/1984 | Williams |
| 4,497,871 A | 2/1985 | Henke |
| 4,501,077 A | 2/1985 | Young |
| 4,519,148 A | 5/1985 | Sisco |
| 4,535,121 A | 8/1985 | Oezelli et al. |
| 4,554,749 A | 11/1985 | Ostrander |
| 4,640,858 A | 2/1987 | Barnett |
| 4,658,514 A | 4/1987 | Shin |
| 4,702,021 A | 10/1987 | Cameron |
| 4,779,360 A | 10/1988 | Bible |
| 4,825,564 A | 5/1989 | Sorce |
| RE33,018 E | 8/1989 | Ostrander |
| 4,879,969 A | 11/1989 | Haranoya et al. |
| 4,899,411 A | 2/1990 | Johnson et al. |
| 4,924,608 A | 5/1990 | Mogonye |
| 4,963,392 A | 10/1990 | Molnar et al. |
| 4,963,422 A | 10/1990 | Katz et al. |
| 5,038,500 A * | 8/1991 | Nicholson ............ 36/59 C |
| 5,108,777 A | 4/1992 | Laird |
| 5,173,325 A | 12/1992 | Knobbe et al. |
| 5,259,125 A | 11/1993 | Gromes |
| 5,263,233 A | 11/1993 | Kim et al. |
| 5,276,981 A | 1/1994 | Schaffer et al. |
| 5,290,607 A | 3/1994 | Chitouras |
| 5,403,638 A | 4/1995 | Yanagizawa et al. |
| 5,403,884 A | 4/1995 | Perlinski |
| 5,425,186 A | 6/1995 | Hoyt |
| 5,485,687 A | 1/1996 | Rohde |
| 5,694,704 A | 12/1997 | Kasbrick |
| 5,799,418 A | 9/1998 | Davis |
| 5,921,005 A | 7/1999 | Bell et al. |
| 5,928,731 A | 7/1999 | Yanagida et al. |

(56) References Cited

U.S. PATENT DOCUMENTS

| | | | |
|---|---|---|---|
| 6,055,748 | A | 5/2000 | Harrison |
| 6,106,920 | A | 8/2000 | Pichon et al. |
| 6,182,377 | B1 | 2/2001 | Toensing |
| 6,214,141 | B1 | 4/2001 | Kim et al. |
| 6,243,973 | B1 | 6/2001 | Lind |
| 6,255,235 | B1 | 7/2001 | Hiraoka et al. |
| 6,306,498 | B1 | 10/2001 | Yuuki et al. |
| 6,430,844 | B1 | 8/2002 | Otis |
| 6,660,205 | B1 | 12/2003 | Harkins, Sr. |
| 6,900,547 | B2 | 5/2005 | Polk, Jr. et al. |
| 6,913,784 | B2 | 7/2005 | Xue et al. |
| 7,191,549 | B2 * | 3/2007 | Koo ............................ 36/59 C |
| 7,516,506 | B2 | 4/2009 | Koo et al. |
| 7,827,640 | B2 | 11/2010 | Koo et al. |
| 2002/0112379 | A1 | 8/2002 | Sussmann et al. |
| 2002/0157281 | A1 | 10/2002 | Safdeye et al. |
| 2003/0009919 | A1 * | 1/2003 | Stein ............................ 36/59 R |
| 2003/0121179 | A1 | 7/2003 | Chen |
| 2003/0171049 | A1 | 9/2003 | Arnold et al. |
| 2003/0175417 | A1 | 9/2003 | Trevisan |
| 2004/0091784 | A1 | 5/2004 | Frederiksson et al. |
| 2004/0163190 | A1 | 8/2004 | Loughran |
| 2004/0194341 | A1 * | 10/2004 | Koo ............................ 36/9 R |
| 2004/0194345 | A1 | 10/2004 | Koo |
| 2008/0230942 | A1 | 9/2008 | Koo |

FOREIGN PATENT DOCUMENTS

| | | |
|---|---|---|
| GB | 0886222 | 1/1962 |
| GB | 1443331 | 7/1976 |
| GB | 2 201 082 | 8/1988 |
| JP | S59-362 | 1/1984 |
| JP | S61-225380 | 10/1986 |
| JP | 62071695 | 4/1987 |
| JP | H3-170101 | 7/1991 |
| JP | 2000308501 | 11/2007 |
| WO | WO2001/26863 | 4/2001 |
| WO | WO2004042847 | 5/2004 |

OTHER PUBLICATIONS

"Plastics extrusion", definition from Wikipedia, printed out from http://en.wikipedia.org/wiki/Plastics_extrusion on May 16, 2007.
International Search Report and Written Opinion of the International Searching Authority in parent's corresponding PCT application PCT/US07/69410, dated Aug. 14, 2008.
Prosecution history of parent U.S. Appl. No. 11/751,581 (now U.S. Pat. No. 7,516,506).
Prosecution history of parent U.S. Appl. No. 12/408,702 (now U.S. Pat. No. 7,827,640).
Prosecution history of parent U.S. Appl. No. 12/898,550 (now U.S. Pat. No. 8,234,736).
Prosecution history of parent U.S. Appl. No. 13/543,858.
Prosecution history of parent U.S. Appl. No. 10/438,375 (now U.S. Pat. No. 7,191,549).
Prosecution history of parent U.S. Appl. No. 11/674,668.
Prosecution history of U.S. Appl. No. 12/912,722.
Prosecution history of parent U.S. Appl. No. 12/912,729.
Prosecution history of parent U.S. Appl. No. 11/530,419.
Prosecution history of parent U.S. Appl. No. 11/866,289 (now U.S. Pat. No. 7,846,493).

* cited by examiner

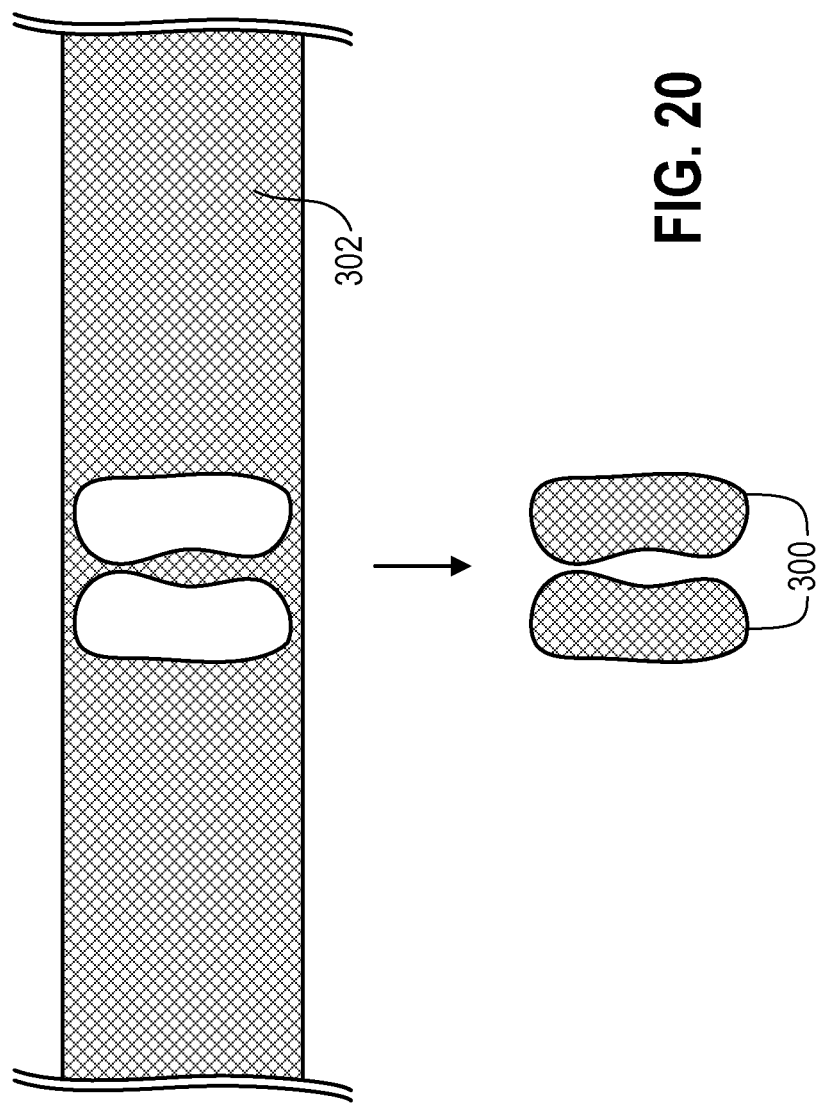

SHOE HAVING INDIVIDUAL PARTICLES BONDED TO ITS BOTTOM SURFACE

This application is: (1) a continuation in part of U.S. patent application Ser. No. 14/064,131, filed Oct. 26, 2013, which is a continuation in part of U.S. patent application Ser. No. 13/543,858, filed Jul. 8, 2012, which is a continuation of U.S. patent application Ser. No. 12/898,550, filed Oct. 5, 2010 (now U.S. Pat. No. 8,234,736), which is a division of U.S. patent application Ser. No. 12/408,702, filed Mar. 22, 2009 (now U.S. Pat. No. 7,827,640), which is a division of U.S. patent application Ser. No. 11/751,581, filed May 21, 2007 (now U.S. Pat. No. 7,516,506), which claimed the benefit of U.S. Provisional Patent Application Ser. No. 60/803,351, filed May 26, 2006, and U.S. Provisional Patent Application Ser. No. 60/896,315, filed Mar. 22, 2007; and is a continuation in part of U.S. patent application Ser. No. 11/530,419, filed Sep. 8, 2006, which claimed the benefit of U.S. Provisional Patent Application Ser. No. 60/803,351, filed May 26, 2006, and U.S. Provisional Patent Application Ser. No. 60/745,926, filed Apr. 28, 2006, and which was a continuation in part of U.S. patent application Ser. No. 10/613,741, filed Jul. 3, 2003, which was a continuation in part of U.S. patent application Ser. No. 10/438,375, filed May 15, 2003 (now U.S. Pat. No. 7,191,549), and which claimed the benefit of U.S. Provisional Patent Application Ser. No. 60/460,260, filed Apr. 3, 2003; (2) a continuation in part of U.S. patent application Ser. No. 13/733,974, filed Jan. 4, 2013, which is a continuation of U.S. patent application Ser. No. 12/686,237, filed Jan. 12, 2010 (now U.S. Pat. No. 8,414,810), which is a division of U.S. patent application Ser. No. 12/050,887, filed Mar. 18, 2008 (now U.S. Pat. No. 7,713,457) which claimed the benefit of U.S. Provisional Patent Application Ser. No. 60/896,315, filed Mar. 22, 2007; and (3) and U.S. patent application Ser. No. 13/295,360, filed Nov. 14, 2011, which is a continuation in part of U.S. patent application Ser. No. 12/604,511, filed Oct. 23, 2009 (now U.S. Pat. No. 8,591,790), which is a division of U.S. patent application Ser. No. 11/684,311, filed Mar. 9, 2007 (now U.S. Pat. No. 7,700,021), which is a division of U.S. patent application Ser. No. 10/630,032, filed Jul. 30, 2003 (now U.S. Pat. No. 7,203,985), which claim the benefit of U.S. Provisional Patent Application Ser. No. 60/400,322, filed Jul. 31, 2002. All of the foregoing applications are incorporated by reference herein as though set forth herein in full.

FIELD OF THE INVENTION

The present invention mainly concerns footwear. It encompasses, among other things, a shoe (e.g., an outdoor shoe) having a bottom surface that is partially or wholly covered with particulate material, as well as shoe outsoles and to methods for making shoe outsoles.

BACKGROUND

Surprisingly little variation has been provided in the construction of the bottom surface of conventional shoes. While some efforts have been made to utilize different materials in the construction of a shoe's outsole and/or heel, these efforts have provided only limited variation from the standard shoe, which has one or two pieces of material forming its bottom surface. As a result, certain textures, properties and appearances have not been available from conventional shoes.

One limitation of conventional shoes is that, although many different types of shoes have been available to consumers, each shoe generally is only useful for a single purpose. In this regard, for example, shoes can be categorized as either indoor shoes or outdoor shoes. Within each of these general categories are many subcategories.

Indoor shoes include various types of slippers, moccasins, slipper boots and similar types of softer and less durable shoes. Typically, the preferred characteristics of an indoor shoe include some combination of comfort, warmth and appearance. In addition, it generally is desirable for indoor shoes to have a soft bottom, so as not to scuff, scratch or otherwise damage hardwood or similar indoor floor surfaces. As a result, most indoor shoes are made entirely of soft fabrics and other soft materials.

Outdoor shoes, on the other hand, generally need to be capable of accommodating harsher surfaces and environments. Therefore, outdoor shoes usually are made of stronger and more durable materials, such as natural and/or synthetic leather, rubber and/or durable fabrics. The sole of an outdoor shoe, in particular, generally must be very strong and durable in order to protect the wearer's foot from rough or jagged ground surfaces. Outdoor shoes include, for example, a variety of dress shoes, casual shoes, tennis shoes, running shoes, work shoes and boots, sandals, thongs and sneakers. Generally speaking, a different combination of characteristics is desired for shoes in each of these subcategories.

The differences in the desired properties of indoor shoes versus outdoor shoes, as well as the differences among the various subcategories, conventionally have meant that any single shoe has been satisfactory for only a single purpose. That is, utilizing conventional shoe manufacturing techniques, it has been very difficult to provide a shoe that can be utilized for multiple different purposes.

In addition, a variety of different processing techniques have been used to provide the shoe's sole with particular characteristics and/or to obtain advantageous import duty rates that typically apply to shoes having an outsole in which at least 50% of the ground-contacting surface is made of a natural material. Examples of such processing techniques include molding fabric or other natural materials into the shoe's outsole and flocking the shoe's outsole with natural fabric fibers.

SUMMARY OF THE INVENTION

The present inventor has recognized the desirability of a shoe that has different properties than can be provided by conventional shoes. For example, the present inventor has discovered that it often will be desirable to have a shoe that can be used for a time as an indoor shoe and then subsequently used as an outdoor shoe.

The present invention addresses these needs by providing a shoe in which small material particles cover at least a portion of the bottom surface of the shoe. As a result, the range of appearances, tactile properties and other properties that may be provided on the bottom surface of a shoe is greatly expanded. In one particular example described below, a shoe according to the present invention can be worn indoors for a period of time and then worn outdoors on a long-term basis.

More specifically, in one aspect the invention is directed to a shoe having a bottom surface that is adjacent to the ground in normal use. A sole, which is sufficiently durable for long-term outdoor use, forms at least a portion of the bottom surface, and an upper portion extends above the sole.

A plurality of small material particles are bonded to at least a portion of the bottom surface of the shoe.

In another aspect, the invention is directed to a shoe having a bottom surface that is adjacent to the ground in normal use. A sole, which is sufficiently strong for long-term outdoor use, forms at least a portion of the bottom surface. A plurality of small material particles are bonded to at least a portion of the bottom surface of the shoe.

By providing small material particles on the bottom surface of a shoe, the present invention can provide shoes that have multiple purposes. For example, a shoe according to the present invention having fabric particles bonded to its bottom surface might be used for a time as an indoor shoe and then subsequently used as an outdoor shoe. The small material particles may be directly bonded onto the outsole of the shoe, or instead may be applied to a sheet material or other substrate which is then bonded or otherwise attached to the bottom surface of the shoe's outsole.

In the preferred embodiments of the invention, the shoe's sole is sufficiently strong, durable (e.g., abrasion-resistant) and/or well-cushioned to permit the shoe to be commercially accepted as an outdoor shoe. Generally speaking, it is preferable to coat a significant part (e.g., all, substantially all, or at least a majority) of the ground-contacting portion of the bottom surface of the shoe with small material particles.

In certain preferred embodiments, only the ground-contacting portion of the bottom surface of the shoe (in whole or in part) is coated with the small material particles, meaning that the surfaces of any indentations in the bottom of the shoe are not coated with the small material particles. As a result, the small material particles may tend to wear away when the shoe is worn outdoors, with the rate of wear depending upon the nature of the small material particles and the technique and/or materials used for bonding them to the bottom surface of the shoe.

The present invention also provides a shoe outsole and/or a sheet material which can be used to fabricate such an outsole (among other things), formed of a base material that includes a number of indentations and lower-extending portions. Small particles are bonded to at least some of the indentations, but the lower-extending portions predominantly are uncoated with such small particles. Also provided are methods and techniques for manufacturing such outsoles and sheet material, as well as shoes incorporating such outsoles.

The present invention also addresses the foregoing needs by providing shoe outsoles and techniques for making shoe outsoles which utilize a composite sheet material (e.g., fabric or fabric fibers embedded into a base material).

Thus, in one aspect the invention is directed to systems, methods and techniques for making a shoe outsole and to shoe outsoles made using such techniques. In one such technique, a sheet of composite material is produced by extruding a base material together with a sheet of fabric material. The sheet of composite material is then cut into an outsole component, and a shoe outsole is fabricated using the outsole component.

In another, a base material is extruded into a sheet of base material. Then, individual fibers are deposited onto a surface of the sheet of base material before the sheet of base material has fully hardened. The fibers are pressed into the surface of the sheet of base material in order to form a sheet of composite material, and the sheet of composite material is cut into an outsole component. Finally, a shoe outsole is fabricated using the outsole component.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

FIG. 20 illustrates the cutting of a shoe outsole from a sheet of composite material.

DESCRIPTION OF THE PREFERRED EMBODIMENT(S)

Figure 1:
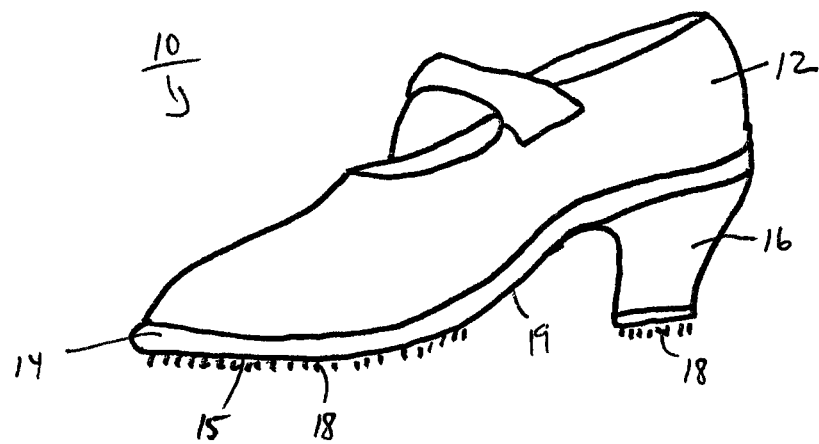
FIG. 1 illustrates a perspective view of a shoe according to a representative embodiment of the present invention.

Generally speaking, the present invention concerns a shoe having small material particles bonded to its bottom surface. Such particles may be any of a variety of shapes, such as being thin fibers, cylindrical, ellipsoid, cubical, cuboid, other polyhedron or substantially spherical, with the chosen shape typically depending upon the type of material being utilized and the effect that is desired to be achieved. The most important aspect of such particles is their small size, and typically they will weigh less than 0.1, 0.01, 0.001, 0.0001, 0.00001 or even 0.000001 gram each, on average. In any event, it is preferable that such particles are small enough to permit a large number of distinct particles to be attached to the bottom surface of the shoe. Depending upon the amount of surface area to be covered and the size of the particle used, typically at least 100, 1,000, 10,000, 100,000 or 1,000,000 such particles will be used.

Generally speaking, such particles may be formed from any type of material. Examples include any of: wood (e.g., ground into dust or converted into pulp and then formed into small particles); paper (e.g., converted into pulp and then formed into small particles); leather (e.g., dried and ground into small particles); a composite leather and wood mixture; glass; natural or synthetic fibers; natural plant material (e.g., dried and ground into small particles or else cut or in into small, thin fibers), natural or synthetic rubber, any of a variety of different types of metal (e.g., steel or aluminum), plastic, silicone, Styrofoam, or any other type of material, although natural and/or organic materials generally are preferred. In each case, the material preferably is ground, cut, broken or formed into small particles of a size appropriate for the intended purpose, e.g., any of the sizes listed above.

Generally speaking, the foregoing particles will adhere to the bottom surface of a shoe using a separate glue or other separate adhesive material. Various types of adhesive can be used depending upon the desired wearability, durability and density of the particles. In the preferred application process, adhesive material is applied (preferably, a liquid adhesive applied in a uniform manner) to the bottom surface of the shoe (i.e., that portion which is adjacent to the ground). Then, the particles are applied onto the bottom surface of the shoe using any of a variety of different techniques. For example, the particles may be (i) sprayed (e.g., using a compressed air spray) onto the bottom surface of the shoe; (ii) made airborne (e.g., by blowing the particles into the air or dropping them from an appropriate height) and then allowed to settle on the bottom surface of the shoe; (iii) pressed onto the bottom surface of the shoe; (iv) rolled onto the bottom surface of the shoe; or (v) in a more specialized technique that generally will only be suitable for certain types of fibers or other particles, flocked onto the bottom surface of the shoe. In any event, the particles preferably are applied in a controlled and/or predetermined manner in order to produce a uniform appearance of the particles on the bottom surface of the shoe. A certain amount of randomness may be part of such particle-application process, such as is present in flocking, spraying and allowing the particles to drift downwardly and settle; however, the process nevertheless preferably is controlled so is to produce a distribution having a uniform density (or at least a density having controlled variations).

In a somewhat modified technique, the particles are suspended in a solution which is then brushed on (or otherwise applied) and allowed to dry. Such a technique is similar to the way that felts and similar nonwoven fabrics sometimes are manufactured.

The particles may be bonded directly to the bottom surface of the shoe or else may be first bonded to a separate substrate which is then bonded or otherwise attached to the bottom of the shoe. In the first case, a shoe may be manufactured in a conventional manner, and then the particles are bonded to its bottom surface (e.g., by coating with adhesive material and then applying the particles). In the latter case, the substrate typically will be a sheet of material (e.g., a thin sheet of EVA, PVC or TPR) to which the particles are bonded (e.g., by coating with adhesive material and then applying the particles), followed by a process in which the sheet material is bonded to the bottom surface of the shoe (e.g., using adhesive material or heat and/or pressure).

In either of the foregoing embodiments, the type of bonding used (for either attaching the particles or attaching the substrate (if used) to the shoe is not critical, but instead generally will depend in each situation upon external considerations, such as price, desired physical properties, etc. Such bonding may constitute or include, for example, either or both of gluing or application with the use of heat and/or pressure (as to the latter, e.g., inserting the particles into a mold that is used to form the substrate or the bottom of the shoe or inserting the substrate with particles bonded into a mold that is used to form the bottom of the shoe).

In one alternate embodiment, the substrate (to which the particles are, or are to be, bonded or otherwise attached) is bonded to another sheet of material (e.g., EVA, any type of polymer, TPR, or any other natural or synthetic rubber), resulting in a two-layer structure. Then, the combination is cut into shoe sole patterns, with the side of each such shoe-sole pattern then being ground to eliminate visible seams and/or to create any other desired aesthetic effect. Such grinding can be performed either before or after attaching the two-layer structures to the rest of the shoe (or other portions of the shoe).

The following description concerns a specific embodiment of the present invention in which natural or synthetic fibers are flocked onto the bottom surface of a shoe. Although the following example illustrates certain concepts and variations on the present invention, it should be understood that a variety of other types of particles and a variety of other types of techniques for applying them may instead be utilized.

The present invention also contemplates the use of thinner outsoles, e.g., as thin as 1-2 millimeters (mm). For example, outdoor shoes might employ such thin outsoles as the bottom layer of a multi-layer sole. One specific example in this regard is the use of a thin substrate to which the particles are bonded as the bottom layer of the shoe's outsole; see the discussion above.

The following description generally concerns a specific embodiment of the present invention in which natural or synthetic fibers are flocked onto the bottom surface of a shoe. A similar flocking technique may be used to apply a variety of other types of particles, as well. Also, although the following example illustrates certain generally applicable concepts and variations on the present invention, it should be understood that a variety of other types of particles and a variety of other types of techniques for applying them (e.g., using any or all of the following concepts and techniques) may instead be utilized. For example, rather than using a separate adhesive material, the individual particles may be bonded by heating or otherwise temporarily softening the base material and then pressing the particles into the surface of the base material. One example, described in more detail below, uses rollers to manufacture sheet material in this manner.

Flock-Bottomed Shoe.

In the preferred embodiments of the invention, the shoe has a strong and/or durable outsole. One advantage of such a shoe is that it can be used for a time as an indoor shoe and then subsequently used as an outdoor shoe. When initially worn indoors, such a shoe preferably will have a relatively soft fabric bottom (e.g., when flocked with fabric or other fibers), at least across sections of the shoe's bottom surface (e.g., more than 50% of the ground-contacting surface area of the shoe's sole) thereby preventing the surface of indoor floors from becoming scratched, scuffed or otherwise damaged. Then, when worn outdoors the flocking material generally will tend to wear away rather quickly, thereby exposing the more durable outsole of the shoe.

Thus, a shoe of the present invention preferably is constructed primarily for outdoor use, but has a bottom that is at least partially covered with small particles, such as natural fibers or other natural materials. There are several well-known distinctions between indoor and outdoor shoes. For example, outdoor shoes typically have significantly more durable bottoms and therefore are capable of being worn outdoors for a long period of time, such as for eight hours a day over a period of one month, two months, four months, eight months or even more than a year, without sustaining wear that would unduly affect the comfort and/or protection provided by the shoe. On the other hand, an indoor shoe generally has a much less durable bottom which would wear out quickly if worn outdoors for any extended period of time.

One commonly used test for determining the durability of a shoe's outsole is ASTM-D1630(NBS) which measures resistance to abrasion and which is promulgated by the American Society for Testing and Materials (ASTM). A shoe according to the present invention preferably has an outsole having a resistance to abrasion, as measured by ASTM-D1630(NBS), of at least 15 percent, 25 percent, 35 percent, 45 percent, 60 percent, 80 percent, 100 percent, 150 percent or 200 percent.

Another distinction between outdoor and indoor shoes is that outdoor shoes typically have outsoles that are much stronger than the outsoles provided on indoor shoes. A strong outsole is highly desirable in an outdoor shoe in order to protect the wearer's foot from injury caused by sharp objects, jagged terrain and similar hazards. Such hazards are a much less significant concern with respect to indoor footwear. One standardized test for determining the strength of an outsole is ASTM-D624 which measures tear resistance. The outsole of a shoe according to the present invention preferably has a tear resistance, as measured by ASTM-D1630(NBS), of at least 4 kilograms (kg)/centimeter (cm), 6 kg/cm, 9 kg/cm 12 kg/cm, 15 kg/cm, 20 kg/cm or 25 kg/cm.

A further distinction between outdoor and indoor shoes is that an outdoor shoe generally must have more cushioning than an indoor shoe, in order to provide adequate comfort when the wearer walks across the variety of different hard and/or rough surfaces that frequently are encountered in connection with outdoor use. Most indoor shoes would not provide a commercially acceptable level of comfort when worn in normal use outdoors.

A still further distinction between indoor and outdoor shoes is that an outdoor shoe typically protects the wearer's foot much more than an indoor shoe would from a number of different elements, such as heat, cold and moisture. Thus, for example, an outdoor shoe might be impervious to water, might provide sufficient thermal insulation to keep the wearer's foot warm even worn in temperatures below 32 degrees Fahrenheit (° F.), 20° F. or even 10° F.

A variety of different designs and materials may be utilized in the construction of an outdoor shoe. For example, the shoe's outsole may be made from any of a variety of different materials, including a rubbery material (e.g., cured natural rubber, thermoplastic rubber (TPR), or any other synthetic rubber), natural or a synthetic leather, ethylene vinyl acetate (EVA), a polyurethane elastomer, polyvinyl chloride (PVC), any other plastic materials, and/or any other suitable materials. An outdoor shoe according to the present invention preferably has an outsole that is comprised of at least ¼ inch thick, ⅜ inch thick or ½ inch thick of a plastic material; at least ¼ inch thick, ⅜ inch thick or ½ inch thick of a rubbery material (e.g., natural or synthetic rubber); or at least ⅛ inch thick, 3/16 inch thick or ¼ inch thick of a more rigid or less pliable material, such as natural or synthetic leather. As a further alternative, the shoe's sole and/or outsole may be constructed at least in part from wood and then coated with plastic.

As indicated above, a shoe according to the present invention preferably has the same appearance as a conventional shoe, except that at least a portion of its bottom surface is coated with flocking material, e.g., natural fibers. Of course, in alternate embodiments of the invention, other small particles attached in any of a variety of other ways, as described in more detail above, may be substituted for such flocking material. Accordingly, references below to flocking or to flocking material generally may also apply to such other small particles and to such other techniques for applying or embedding them. Also, the term "flocking material" simply means material that is suitable for flocking but does not imply that such material can only be applied by flocking, but rather such material may be applied using any of the techniques described herein. FIG. 1 illustrates a perspective view of a shoe 10 according to a representative embodiment of the present invention. As shown in FIG. 1, shoe 10 includes the conventional features of a shoe, such as an upper portion 12, a sole 14 and a heel 16. It is noted that sole 14 may be comprised of separate components, such as a separate insole (the portion upon which the wearer's foot rests) and a separate outsole (the bottom portion of the shoe 10, other than the heel 16). Alternatively, the insole and outsole of sole 14 may form a single unitary piece, in which case references to either the insole or the outsole refer to that single unitary piece. The upper 12 may be attached to the sole 14 using stitching, gluing, a combination of the two, or any other known technique.

In the illustrated embodiment, the portion 15 of the bottom surface of shoe 10 that normally comes in contact with the ground (i.e., the ground-contacting portion) consists of the entire bottom surface of heel 16 and the portion of the bottom surface of sole 14 that extends approximately from the middle to the front of sole 14. As further shown in FIG. 1, such ground-contacting portion of the bottom surface of shoe 10 is coated with a flocking material 18. At the same time, the portion 19 of the sole 14 that normally does not come in contact with the ground (i.e., the non-ground-contacting portion) is not coated with flocking material 18.

Figure 2:
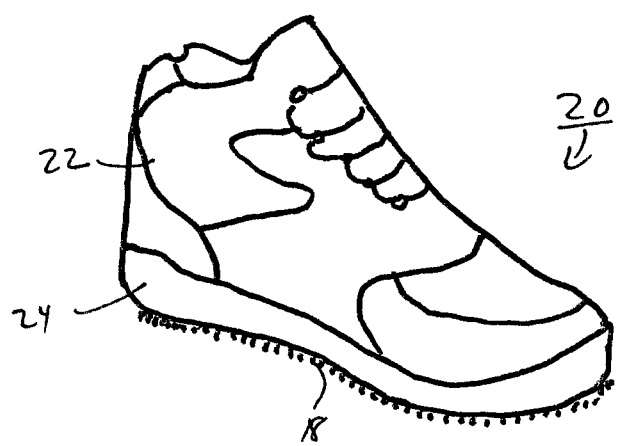
FIG. 2 illustrates a perspective view of a shoe according to an alternative embodiment of the present invention.

FIG. 2 illustrates an alternative embodiment of a shoe 20 according to the present invention. As shown in FIG. 2, shoe 20 also includes an upper portion 22 and a sole 24, but no separate heel. In this embodiment of the invention as well, the ground-contacting portion of the bottom surface of shoe 20 is coated with flocking material 18. In this case, however, because the entire bottom surface of shoe 20 is flat, the entire bottom surface of shoe 20 is covered with such flocking material 18. As described in more detail below, if the bottom surface of shoe 20 has grooves, recesses or other indentations (i.e., is contoured), it is possible to coat only (or primarily) the ground-contacting portion of such bottom surface with flocking material, to coat the entire bottom surface of shoe 20 with flocking material, to coat only (or primarily) the grooves, recesses or other indentations with such flocking material, or any combination thereof.

In still further alternative embodiments of the invention, the entire ground-contacting portion of the bottom surface of a shoe is not coated with flocking material. Rather, only some part of the ground-contacting portion of the shoe's bottom surface is covered with flocking material. In the preferred embodiments of the invention, a substantial part of the ground-contacting portion of the bottom surface of the shoe is covered with natural fabric flocking material. More preferably, at least 50, 60, 70, 80 or 90 percent of the area upon which the shoe normally contacts the ground is fabric material (e.g., individual fibers flocked on).

In one representative embodiment, all of such ground-contacting fabric area has been achieved by flocking. However, it is also possible to use other techniques (e.g., any of the techniques described herein, including molding individual fibers or fabric material into the shoe's outsole, pressing individual fibers or fabric material into the shoe's outsole, or gluing individual fibers or fabric material to the bottom of the shoe) in connection with the flocking to achieve these desired percentages. The specific combination of techniques utilized, as well as the amount and configuration of flocked (or otherwise covered) areas, generally will be dictated by the desired aesthetic effect and/or by functional requirements.

Figure 3A:
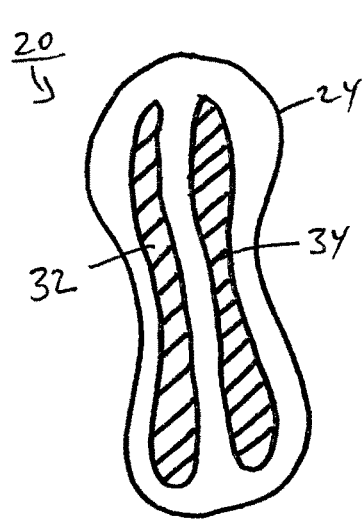
FIGS. 3A and 3B show plan views of the bottom surface of a shoe according to a representative embodiment of the invention.

One example in which only a part of the ground-contacting portion of the shoe's bottom surface is coated with flocking material is illustrated in FIG. 3A, which shows a plan view of the bottom surface of shoe 20. As shown in FIG. 3A, only the left portion 32 and the right portion 34 of the bottom surface of sole 24 are coated with flocking material 18. Where such partial flocking is utilized, it is not critical that any particular areas be coated with flocking material 18. Instead, flocking material 18 may be applied in any desired pattern.

Figure 3B:
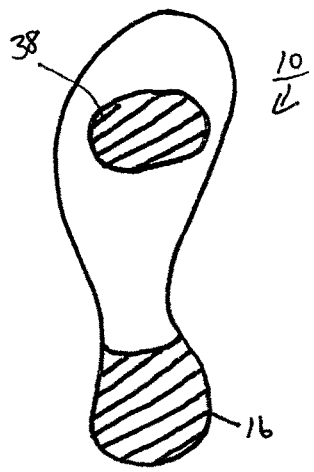

Another example of such partial flocking is shown in FIG. 3B, which illustrates the bottom plan view of shoe 10. In this example, the entire bottom surface of heel 16 is coated with flocking material 18. However, only a portion 38 of the ground-contacting bottom surface of sole 14 is coated with flocking material 18. Once again, the specific arrangement of flocking material in any particular embodiment may be selected to achieve any desired aesthetic effect and/or any functional objectives, such as comfort and/or slip resistance.

Any conventional flocking technique may be utilized to achieve the flocking material patterns discussed above. Generally speaking, flocking involves coating a desired surface with an adhesive material, placing the article to be flocked into a chamber together with short airborne fabric fibers, and taking steps to cause of the fibers (or other elongated particles) to embed into the surface at a right angle. The most common techniques for achieving this latter result include electrostatically charging the fabric fibers and/or mechanically beating the article to be flocked (typically used when flocking a sheet material). Frequently, a combination of these two techniques is utilized. Specific techniques and materials for applying flocking material to objects are well-known and are described, for example, in U.S. Pat. No. 4,535,121 (Ozelli), U.S. Pat. No. 4,879,969 (Haranoya), U.S. Pat. No. 4,963,422 (Katz), U.S. Pat. No. 5,108,777 (Laird), U.S. Pat. No. 6,106,920 (Pichon), U.S. Pat. No. 6,214,141 (Kim), U.S. Pat. No. 3,776,753 (Habib), and U.S. Pat. No. 4,640,858 (Barnett); each of which is incorporated by reference herein as though set forth herein in full.

In the preferred embodiments of the invention, the flocking material is applied directly to the base material, i.e., the material that otherwise would form the bottom surface of the heel and/or to the material that otherwise would form the bottom surface of the outsole of the subject shoe. Preferably, this is done before the upper of the shoe is attached to the heel and/or outsole. However, it is also possible to apply the flocking material to the bottom of the shoe after the shoe has been fully constructed. Still further, the flocking material may be applied at any other point during construction of the shoe. In any event, where the flocking material is applied directly to the bottom surface of the shoe (i.e., by flocking such bottom surface), the use of electrostatic flocking generally is preferred.

In certain embodiments of the invention, the flocking material first is applied to a fabric backing or other sheet material (e.g., EVA, PVC or TPR). Then, such fabric backing or other sheet material is glued or otherwise bonded onto the bottom surface of the shoe's heel and/or outsole. Alternatively, such a fabric backing or sheet material may be inserted into the mold (e.g., in connection with an injection molding process or a stamping process) when forming the shoe's outsole. In any case, pieces of the flocked fabric or other sheet material may be applied in any desired pattern and, in fact, different types of flocked sheet material (e.g., using different colors of flock fibers, different types of flock fibers, or different types of sheet material) may be applied to different locations on the bottom surface of the shoe.

In certain embodiments, the manufacture of a separate fabric or other sheet material with a flocked surface and then the utilization of such a flocked sheet material in the construction of the shoe's outsole and/or heel may be more cost efficient than flocking the shoe's bottom surface after the outsole, heel, or even the entire shoe, has been fully constructed. In such a case, an entire sheet of material may be flocked and then cut into pieces, each of which being sized and shaped appropriately for a corresponding component of the bottom surface of the shoe. In the preferred embodiments, the backing sheet is fairly thin, e.g., not more than 1, 2 or 5 millimeters (mm) thick.

For example, pieces may be cut in the size and shape of: the entire outsole, a portion of the outsole, the entire bottom surface of the heel, or any combination of the foregoing. When manufacturing flocked sheet material for use in the construction of a shoe, the flocked material may be applied prior to or after any appropriate shaping of the surface of the material (e.g., the creation of any desired grooves, recesses or other indentations, in any desired pattern). If applied afterward, then the flocking material may be applied only (or primarily) to the lowest extending portions of the material's surface or to the entire surface of such sheet material, only (or primarily) to the indentations in the material's surface, in any other differential manner between the protrusions and indentations, or to the entire surface of such sheet material, e.g., by selectively applying the adhesive material in the manner described below. In addition, after such flocking, and either before or after incorporation of such flocked sheet material into the corresponding shoe, some or all of the flocked material may be ground off in any desired pattern.

With regard to the partial flocking mentioned above, many shoes have contoured or three-dimensional patterns on their bottom surfaces. With regard to such shoes, the adhesive may be applied (e.g., by spraying, brushing, rolling or dipping) such that the entire contoured surface is coated. Alternatively, the adhesive may be applied (e.g., by brushing, rolling or dipping) such that only to the lowest extending portions of the surface (i.e., those portions that normally would come into contact with the ground) are coated. Still further, the adhesive may be applied to the indentations or to any other selected portions, e.g., by applying it by hand or by using a spray template.

Figure 4:
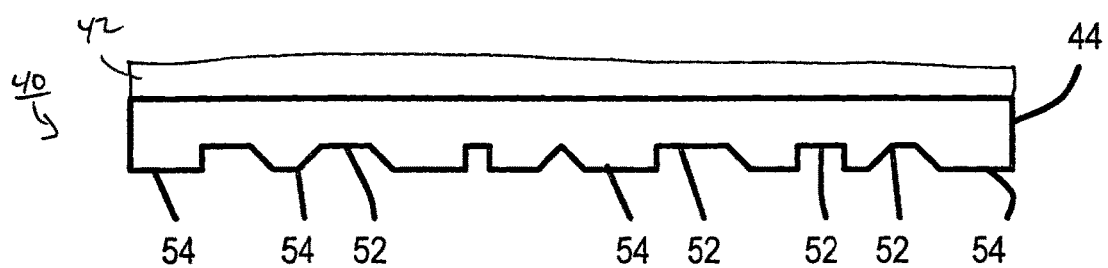
FIG. 4 illustrates a portion of a cross-section of a shoe outsole in accordance with a representative embodiment of the invention.

An advantage of this latter technique is illustrated in FIG. 4, which shows a portion of a cross-section of a shoe sole 40 that includes an insole 42 and an outsole 44. As shown in FIG. 4, the bottom portion of outsole 44 includes multiple indentations 52. Typically, such indentations 52 will be closely spaced and/or a very narrow, with multiple (e.g., 2, 5, 10 or more) such indentations 52 occurring when traversing the bottom of the shoe sole 40 from side to side and/or from front to back. Often, the indentations 52 will be approximately 1-2 millimeters (mm) in width and/or separated from each other by no more than approximately 1-2 mm of lower-extending portions 54. However, any desired widths and/or spacings may be used. By brushing or rolling adhesive onto only the lowest extending parts 54 of the bottom portion of outsole 44, and avoiding applying the adhesive into such indentations 52, it generally will be easier to ensure that flocking material only (or primarily) will adhere to such lowest extending parts 54. Similarly, by dipping the outsole 44 into a thin layer of adhesive, generally only (or primarily) such lowest extending parts 54 will be coated with adhesive and, therefore, ultimately coated with flocking material 18. As a result, typically after only a short amount of outdoor use nearly all of such flocking material will wear away.

It is noted that brushing, rolling or dipping allows one to only coat the lowest extending portions 54 with adhesive, with the result that some or all of the lowest extending portions 54 ultimately are covered with the small particles, while some or all of the indentations are substantially uncoated with such small particles. Another technique for accomplishing the same result is to place against the bottom of the shoe, prior to applying the adhesive, a template which is the three-dimensional reverse of the pattern on the bottom of the shoe. In this way, the template fills in the indentations 52, preventing them from being coated with adhesive during the adhesive-application process. Once the adhesive has been applied, the template can be removed and, in certain embodiments, reused for another shoe.

On the other hand, by applying adhesive both to the lowest extending parts 54 and to the indentations 52 (e.g., by spraying, dipping, rolling or brushing), the entire bottom surface of the subject portion of outsole 44 generally will be coated with flocking material 18. Then, when ultimately used outdoors only the flocking material on the lowest extending parts 54 generally will tend to wear away. In certain embodiments, it may be visually undesirable to then have only the indentations 52 coated with flocking material 18. In other embodiments, however, depending upon the particular ornamental design of the bottom surface of the shoe, such partial wearing away of the flocking material 18 might actually result in a pleasing aesthetic effect. Moreover, the same shoe might have areas of the bottom surface coated with flocking material only on the lowest extending portions 54 and other areas where both the lowest extending portions 54 and the indentations 52 are coated with flocking material, in order to achieve a desired combination of these two different aesthetic effects. Once the flocking material (or other small particles) have been applied, it may be desirable to grind the fibers or other particles to a desired depth.

In the foregoing example, particles of a particular type (fibers) are attached to the bottom surface of a shoe using a flocking technique. In that description, certain variations are described. Except to the extent that such variations are specific to the use of fibers or to flocking, it is intended that such variations also are possible in techniques where other types of particles are applied to the bottom surface of a shoe.

Various types of adhesive may be used for adhering the small material particles to the bottom surface of the shoe. Generally, the selection of the specific adhesive will be based upon the desired effect (e.g., rigid adherence or a more flexible, rubber-like adherence) and also based upon the type, size and shape of the particles used. In addition, it is not strictly necessary to use a separate adhesive material. Instead, the particles may be in bonded to the bottom surface of the shoe by using heat and/or pressure to embed such particles into the bottom surface. Such a method may be preferable where the surface is comprised of a rubber-like substance.

In certain instances in the description of the invention and in the claims, the terms "insole" and "outsole" are used. However, as noted above, in certain embodiments of the invention there may be no clear distinction between the shoe's insole and its outsole, such as in embodiments where those parts of the shoe are integrated into a single unitary peace. Unless the context clearly requires otherwise, use of the term insole or the term outsole is not meant to imply that such part is provided as a separately distinguishable component.

In the embodiments described above, the shoe has a relatively durable sole and is constructed in a matter so as to be appropriate for outdoor use. However, this is not critical to the invention. Indoor and other softer, less durable soled shoes also will benefit from the application of flocking material to their bottom surfaces, e.g., using any of the techniques described above. Moreover, although an enclosed shoe is illustrated in each of the accompanying figures, it should be understood that that the present invention also applies to sandals, thongs and other open-toe shoes. More generally, flocking fibers may be advantageously applied (e.g., as described herein) to the bottom surface of any type of shoe having any type of sole.

Sheet Material with Embedded Fibers or Fabric Material.

In one aspect, the present invention pertains to a composite sheet material that has a plurality of individual fibers or a piece of fabric material embedded within a non-fibrous material, and also pertains to techniques for manufacturing such a composite sheet material.

In this regard, it often is desirable to manufacture a shoe sole having a composite surface, including some areas in which one type of material contacts the ground and other areas in which another type of material contacts the ground. For example, the first type might be a synthetic rubber or other polymer that ordinarily is used as a material for forming a shoe's outsole, while the second type might be a plurality of natural or synthetic fibers or a piece of natural or synthetic fabric. In this disclosure, the term "fabric material" is used in its ordinary sense of referring to a woven or non-woven material that resembles cloth, with its individual fibers bound together, while the term "fibers" refers to distinct particles or strands that generally are not bound together unless otherwise indicated as being so. The techniques of the present invention can be applied with respect to either individual fibers or fabric material. Such individual fibers and fabric material collectively are referred to herein as "fibrous material". In the preferred embodiments, the fibrous material is a natural material, e.g., a natural fabric-type fibrous material.

Specifically, the present invention contemplates two general categories of techniques for manufacturing such a composite material. In the first, both a non-fibrous material and a fibrous material are fed together through an extrusion device (e.g., a conventional extrusion device) that ordinarily is used for manufacturing sheets of non-fibrous material. Such non-fibrous materials can include, e.g., polyvinyl chloride (PVC), acrylonitrile butadiene styrene (ABS), thermoplastic rubber (TPR), ethylene vinyl acetate (EVA), a polyurethane elastomer, natural or synthetic rubber, synthetic leather, any polymer or any type of plastic. It is noted that a conventional extrusion device implements a shaping process in which a continuous sheet of material is produced, typically by forcing liquid or semi-liquid material underneath one or more rollers or between one or more pairs of rollers. As the material exits, it typically is carried along a conveyor, cooled or otherwise allowed or forced to harden, and then cut to the desired length.

According to the first category of embodiments of the present invention, if a fabric material is being used to produce the composite sheet material, the fabric material may be fed underneath the roller(s) together with the liquid or semi-liquid non-fibrous material, so that the resulting material has the desired composite composition. Typically in such a case, the fabric material will be inserted underneath the liquid or semi-liquid non-fibrous material. Alternatively, the sheet of fabric material may be pressed onto the non-fibrous material after the non-fibrous material has exited the roller(s) and is still in a liquid or semi-liquid state. In any event, once the non-fibrous material hardens, the desired composite sheet of material will result.

On the other hand, where individual fibers are being embedded into the non-fibrous material, such fibers may be pre-mixed together with the liquid or semi-liquid material. Alternatively, if, for example, only one side of the resulting composite sheet material is desired to have the composite surface, and/or one wishes to be sure that the individual fibers form a significant part of the surface area for the resulting composite sheet, the individual fibers may be sprinkled or sprayed, during the shaping process or afterward (e.g., on the conveyor belt before the non-fibrous material has hardened or has fully hardened). For example, in one representative embodiment where two or more consecutive rollers are being used, the fibers are sprinkled or sprayed between the rollers.

The second general class of embodiments contemplated by the present invention involves the impression of the plurality of individual fibers or the sheet of fabric material into the surface of the pre-manufactured sheet of non-fibrous material. Typically, a roll of such pre-manufactured non-fibrous material (e.g., any of the types of material mentioned above) is first obtained. Then, a sheet of fabric material is placed on one side of the non-fibrous material, and the combination is passed underneath heated rollers, which apply heat and pressure, partially melting the surface of the non-fibrous material and causing the fabric material to embed into it. A similar technique can be applied by coating the non-fibrous sheet of material with individual fibers and then passing the combination underneath heated rollers. Still further, depending upon the type of the non-fibrous sheet material, chemical or radiation techniques may be utilized to temporarily soften the surface of the non-fibrous material so that the sheet of fabric material or individual fibers can be embedded into it, or even pressure alone can be used to embed the fibrous material into the non-fibrous material.

Generally speaking, in the foregoing embodiments only a single side of the non-fibrous material is embedded with fibrous material. However, in alternate embodiments both sides of the non-fibrous material are embedded with fibrous material, which may be the same fibrous material on both sides or different fibrous materials may be used for the two different sides.

In any event, once a sheet of composite material has been manufactured in accordance with any of the foregoing techniques, it can be cut into any desired shapes and used for any desired purpose. As noted above, one such purpose is to fabricate the outsole of a shoe. The selection of the fibrous and non-fibrous materials for use in the methods of the present invention preferably depends upon the desired characteristics of the resulting composite material.

Outsole or Sheet Material with Particles Bonded to Indentations.

In the following embodiments of the invention, portions of the bottom of a shoe or the surface of a sheet material are covered with a plurality of small particles. Preferably, the particles are fibers and, more preferably, natural fibers that cover only a portion of the bottom surface of the shoe or sheet material. Initially, the following discussion concerns the bottom surface of a shoe and then the same concepts are extended with respect to a general-purpose sheet material.

In the preferred embodiments of the invention, individual fibers are flocked onto the bottom of the shoe (i.e., using techniques that tend to cause them to embed at a substantially right angle to the surface). However, other gluing or bonding techniques instead may be used, or in certain cases the fibers or other small particles (either individually or after being flocked or otherwise bonded onto a sheet of backing material) may even be molded or pressed into the bottom surface of the shoe.

Figure 5:
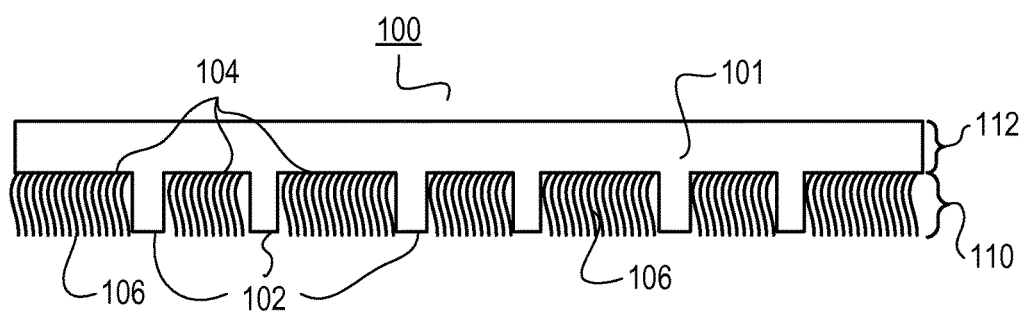
FIG. 5 illustrates a cross-sectional view of a shoe's outsole or of a piece of sheet material, according to representative embodiment of the present invention, in which the fibers are bonded to indentations in the base material at a substantially right angle.

FIG. 5 depicts a cross-sectional view of a shoe's outsole 100. The term "outsole" as used herein refers to the bottom portion or layer of a shoe (i.e., the portion that is adjacent to the ground in normal use). Accordingly, the term outsole may encompass, e.g., the bottom portion of a shoe's heel, where a separate (e.g., an elevated) heel is used. As shown in FIG. 5, the base material 101 of the shoe's outsole has an arrangement of alternating areas in which lower-extending portions 102 (which actually contact the ground in normal use) alternate with indentations 104, which ordinarily would not contact the ground in normal use, but which are covered with natural fibers (or other small particles) 106 that do contact the ground.

In the present embodiment, fibers 106 have been flocked onto the appropriate sections of the bottom of outsole 100. As shown, the flocked fibers 106 extend from the indentations 104 down to approximately the same level as the lower-extending portions 102, so that both the fibers 106 and the lower-extending portions 102 ordinarily will contact the ground in normal use. Because the fibers 106 generally will be softer and more compressible, in certain embodiments of the invention they actually can extend below the surfaces of the lower-extending portions 102 (in their uncompressed state), e.g., slightly below such surfaces, so that when weight is applied they are compressed down to the same level as the surfaces of the lower-extending portions 102.

Figure 6:
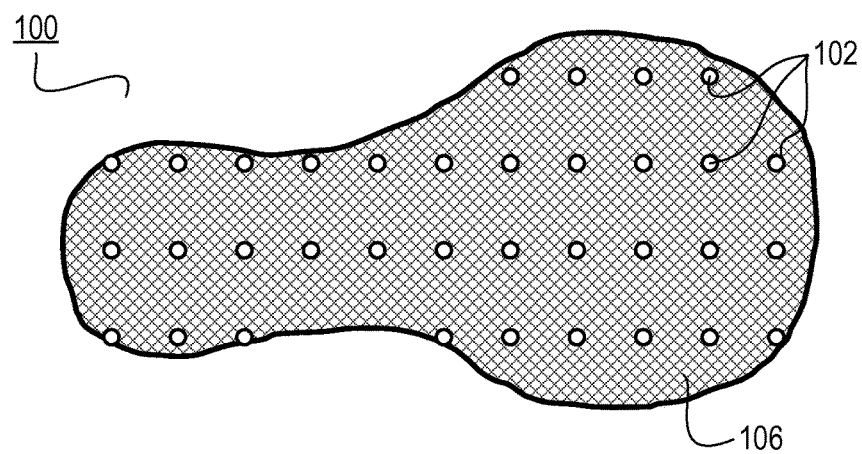
FIG. 6 illustrates a pattern covering the bottom of the shoe's outsole in which lower-extending portions alternate with bonded particles, according to a first representative embodiment of the invention.
Figure 7:
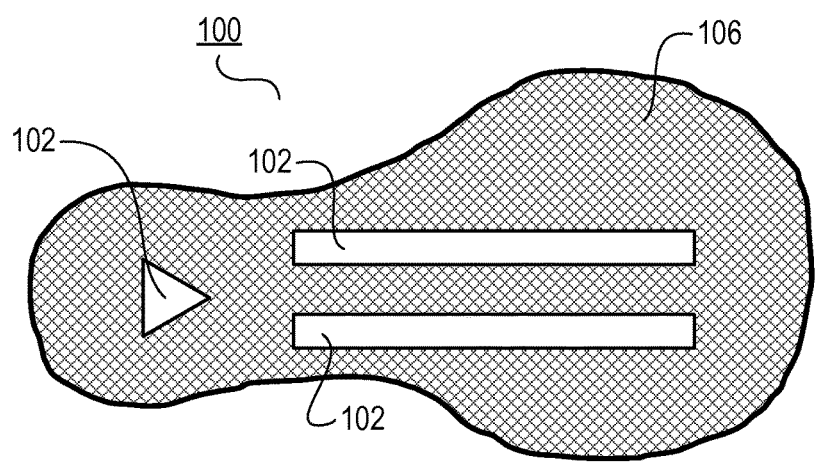
FIG. 7 illustrates a pattern covering the bottom of the shoe's outsole in which lower-extending portions alternate with bonded particles, according to a second representative embodiment of the invention.

FIGS. 6 and 7 illustrate different patterns in which the lower-extending portions 102 alternate with the natural fibers 106. In both patterns, all of the lower-extending portions 102 of the base material 101 for outsole 100 are uncoated and all of the indentations 104 are coated with the natural fibers 106, e.g., such fibers 106 having been flocked on. In alternate embodiments only some of the lower-extending portions 102 are covered with the fibers or other small particles 106 and/or some or all of the indentations 104 may be coated with some of the small particles 106. However, in the preferred embodiments at least some of the protrusions 102 are substantially uncoated with such fibers or other small particles 106. That is, the present invention contemplates a differential coating in which the indentations 104 are coated with the small particles 106 to a greater extent than the protrusions 102.

In FIG. 6, the base material 101 is formed so as to have a repeating pattern in which the lower-extending portions 102 are arranged in a regular grid. In FIG. 7, the lower-extending portions 102 are arranged in a more decorative design, with fewer such lower-extending portions 102, but with each such portion 102 being larger than those of FIG. 6.

In alternate embodiments, any combination of regular patterns and/or more decorative designs may be used, and any sizes and/or combinations of sizes may be used in order to achieve any desired functional and/or aesthetic purpose. However, in the preferred embodiments, the areas of the bottom of the shoe covered by the fibers (or other particles) 106 constitute 50% or more of the surface area of the shoe's outsole 100 that contacts the ground in normal use. More preferably, the areas covered by the fibers (or other particles) 106 constitute at least 50-90% of the surface area of the shoe's outsole 100 that contacts the ground in normal use.

The foregoing patterns can be achieved by manufacturing the base material 101 so as to have the desired protrusions 102 and indentations 104, e.g., from any natural or synthetic material (e.g., EVA, PVC or synthetic rubber). In the preferred embodiments, base material 101 is injection-molded or otherwise molded in sheet form and then cut to the desired size and shape, as described in more detail below. It is noted that the regular repeating pattern of FIG. 6 typically will be easier to manufacture, and often can be produced simply using an extrusion process, as described above.

In any event, adhesive is applied only (or primarily, e.g., as a result of manufacturing errors or to achieve a desired aesthetic effect) to the indentations 104 (e.g., by using a pattern of glue touch-points that matches the pattern of indentations 104, by using a spray template, or by manually applying glue only or primarily to the indentations 104). The end result is that the indentations 104 (or at least selected ones of such indentations 104) predominantly will be coated with the flocking or other particles 106, while the protrusions 102 predominantly will be uncoated with such flocking or other particles 106. Next, the fibers 106 are applied, e.g., by flocking or simply blowing the fibers 106. Finally, any fibers 106 that attached to the lower-extending portions 102 preferably are ground off. Alternatively, the entire bottom of the shoe, protrusions 102 and indentations 104, can be flocked or otherwise coated with fibers 106, and then the fibers 106 can be ground off from the lower-extending portions 102.

In the preferred embodiments, the protrusions 102 extend only slightly below the indentations 104, e.g., so that the depth 110 of the indentations 104 to be coated with the fibers 106 is less than 5 millimeters (mm), or even as shallow as 0.1 mm, but, more preferably, is approximately 1-2 mm. As a result, fibers 106 of approximately that length can be used to achieve the desired effect. Similarly, the thickness 112 of the base material 101, disregarding the protrusions 102, preferably also is less than 5 mm, again even as thin as 0.1 mm, but, more preferably, is approximately 1-2 mm.

One advantage of the foregoing configuration is that, because different types of materials contact the ground simultaneously, the resulting shoe can be manufactured so as to have good traction on a variety of different surfaces. In such a case, for example, the base material 101 might be optimized for one type of surface while the fibers 106 are optimized for another.

Another advantage, particularly with respect to embodiments in which the fibers 106 in their uncompressed state extend beyond the surface of the lower-extending portions 102, is that the fibers 106 can be selected so as to provide a unique two-stage cushioning effect. In such embodiments, a relatively soft cushioning effect is achieved as the fibers 106 contact the ground first and then are crushed and compressed. Eventually, when the fibers 106 have been sufficiently compressed, the base material 101 also contacts the ground and therefore begins to absorb the force, typically providing a firmer cushioning effect.

Figure 8:
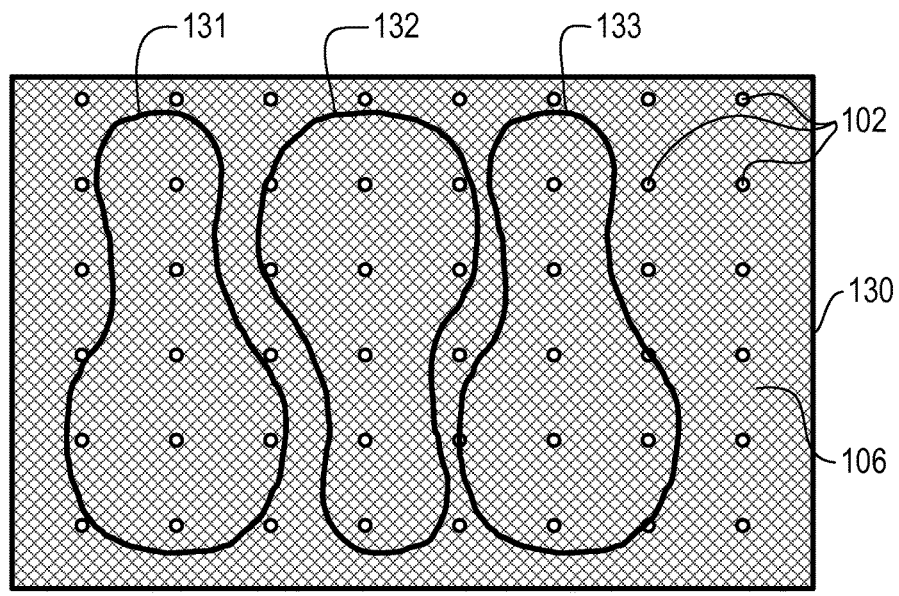
FIG. 8 illustrates one example of a portion of a sheet material, having the same surface pattern as that shown in FIG. 6, according to a representative embodiment of the present invention.

It is noted that the foregoing construction can be applied to sheets of material 101 that may then be cut into any desired shapes, sizes and/or patterns, and then used for any of a variety of different purposes. FIG. 8 illustrates one example of a portion of a sheet material 130 having a pattern that is similar to the pattern shown in FIG. 6, i.e., with a regular grid of lower-extending portions 102 and with the indentations between such lower-extending portions 102 having been flocked (or otherwise coated) with natural fibers 106. The cross-section of sheet material 130 might be, e.g., similar or identical to the cross-section shown in FIG. 5, e.g., with the same preferred dimensions. In the preferred embodiments, the sheet material 130 is manufactured on a continuous basis, rolled and then cut when a roll of the desired size is finished.

Thereafter, such material may be used in manufacturing a wide variety of products. As mentioned above, one use of such material is for the outsole of a shoe. Thus, for example, each of patterns 131-133 may be cut out of the sheet material 130 and then glued or otherwise attached to another component of the shoe in order to form all or portions of the bottom surface of a completed shoe.

Figure 9:
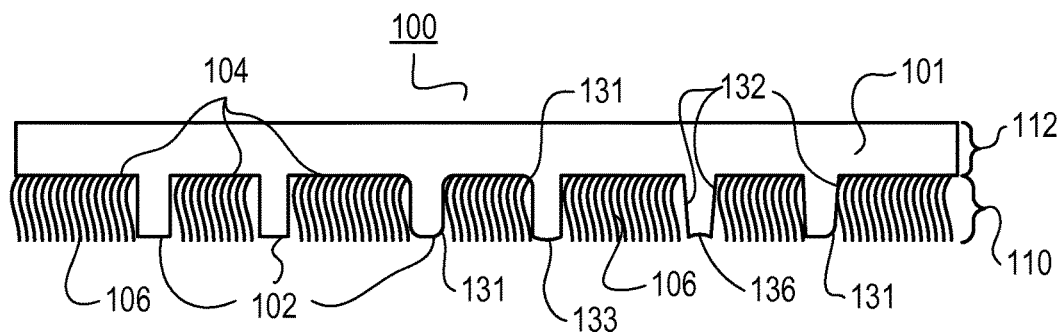
FIG. 9 illustrates a cross-sectional view of a shoe's outsole or of a sheet material according to an alternate representative embodiment of the present invention, in which the protrusions and indentations have varying contours.

A number of variations on the foregoing embodiments are possible. For example, although the protrusions 102 and the indentations 104 are shown in FIG. 5 as having flat surfaces and right-angle edges, any other shapes or designs may be used. Either or both of the protrusions 102 and indentations 104 may be rounded, have triangular, trapezoidal or pyramid shapes (e.g., so that the protrusions 102 resemble pinnacles), or have any other two-dimensional or a three-dimensional shape. An example is illustrated in FIG. 9, in which the various protrusions 102 and indentations 104 include rounded corners 131, sloping edges 132, convex surfaces 133 and concave surfaces 136. Generally speaking, however, flat or nearly flat surfaces and the use of flocking will help to ensure that the heights of the fibers 106 are approximately the same as the heights of the protrusions 102.

Figure 10:
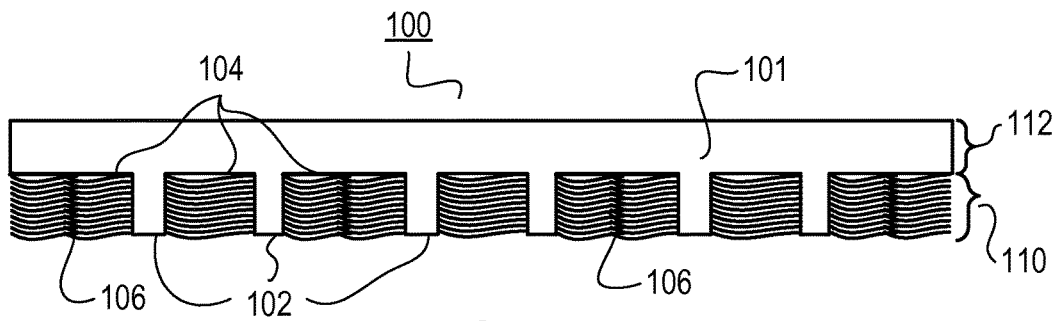
FIG. 10 illustrates a cross-sectional view of a shoe's outsole or of a piece of sheet material according to an alternate representative embodiment of the present invention in which the fibers are bonded in a substantially parallel manner to indentations in the base material.

Also, although the fibers 106 generally are shown in the drawings and described above as having been flocked on (i.e., so they tend to embed at a right angle), such fibers instead may be attached to the base material 101 so that they are approximately parallel to the plane formed by the base material (e.g., in a matted-down or flattened configuration). Such a configuration is illustrated in FIG. 10. In such a case, the fibers 106 may be attached by allowing adhesive material to seep through the fibers 106, or by using any combination of adhesive material, heating and rolling to bind such fibers 106 to the base material 101.

Completing Construction of the Entire Shoe

The foregoing discussion focuses on the construction of a shoe's outsole, e.g., the bottom layer of the shoe which is adjacent to the ground in normal use. Once an outsole according to the present invention has been constructed it can be joined in any known manner to the other components of a shoe in order to complete construction of the shoe. For example, the outsole may be glued or bonded to a midsole or may be molded together with other portions of the shoe's sole. Alternatively, the base material for the outsole may be already attached to other components for the shoe or to the entire rest of the shoe before particles are attached to such base material, as described herein. The specific technique for completing construction of the entire shoe typically will depend upon the type of the shoe which is being manufactured, and the present invention applies to a wide variety of open shoes (e.g., sandals and thongs) and closed shoes (e.g., boots, athletic shoes, dress shoes and casual shoes).

Shoe Outsole Made Using Composite Sheet Material.

Generally speaking, the present invention pertains to a composite sheet material that has a plurality of individual fibers or a piece of fabric material embedded within a non-fibrous base material, to techniques for manufacturing such a composite sheet material, to the use of such a composite sheet material in the construction of a shoe outsole, and to shoe outsoles made using such techniques.

In this regard, it often is desirable to manufacture a shoe sole having a composite surface, including some areas in which one type of material contacts the ground and other areas in which another type of material contacts the ground. For example, the first type (e.g., the shoe outsole's base material) might be a synthetic rubber or other polymer that ordinarily is used as a material for forming a shoe's outsole, while the second type might be a plurality of natural or synthetic fibers or a piece of natural or synthetic fabric. In the present disclosure, the term "fabric material" is used in its normal sense of referring to a woven or non-woven material that resembles cloth, with its individual fibers bound together, while the term "fibers" refers to distinct particles or strands that generally are not bound together.

The techniques of the present invention can be applied with respect to either individual fibers or fabric material. Such individual fibers and fabric material collectively are referred to herein as "fibrous material".

Specifically, the present invention contemplates two general categories of manufacturing such a composite material.

Figure 11:
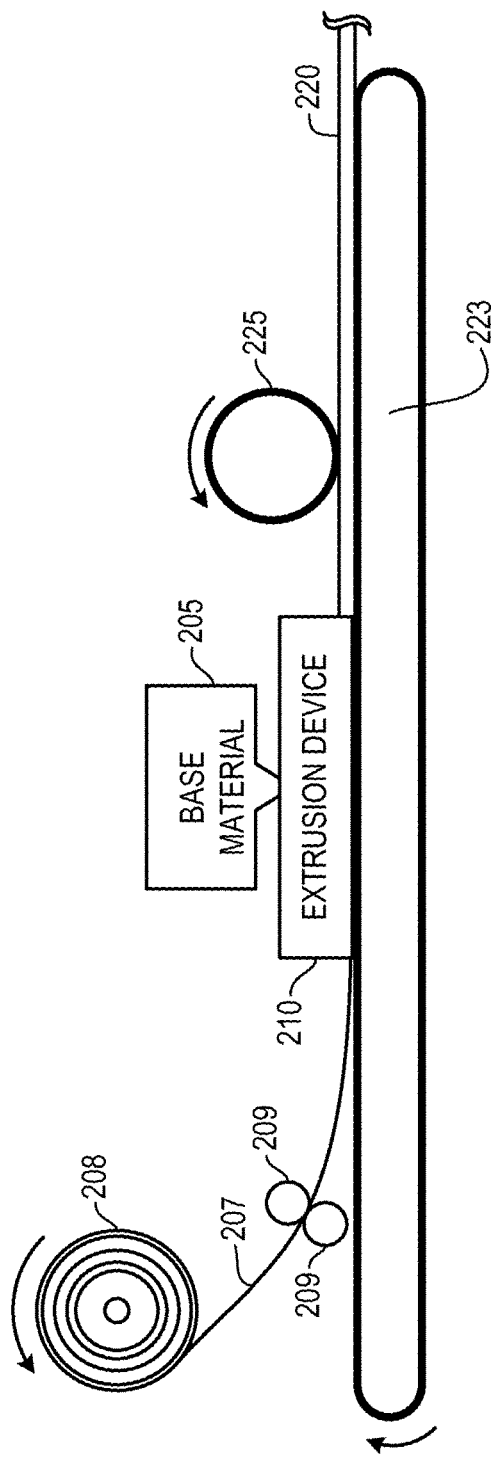
FIG. 11 is a right side conceptual view of a system for making a composite sheet material according to a first representative embodiment of the present invention.

In the first, an example of which being illustrated in FIG. 11, both a non-fibrous material (the base material 205) and a fibrous material (fabric sheet material 207 taken from roll 208 and guided using guiding rollers 209) are fed together through an extrusion device 210 (e.g., a conventional extrusion device that ordinarily is used for manufacturing sheets of non-fibrous material). Various kinds of fabric sheet material 207 that may be used are mentioned above. The base material 205 can include, e.g., polyvinyl chloride (PVC), acrylonitrile butadiene styrene (ABS), thermoplastic rubber (TPR), ethylene vinyl acetate (EVA), a polyurethane elastomer, natural or synthetic rubber, synthetic leather, any polymer or any type of plastic.

A conventional extrusion device 210 typically is used to fabricate long objects of a fixed cross-sectional profile, such as plastic sheet material, by pushing and/or drawing liquid or semi-liquid material through a die of the desired profile shape. As noted above and as shown in FIG. 11, the present embodiment of the invention modifies the conventional process, in part, by feeding fabric sheet material 207 through the extrusion device 210 together with the liquid or semi-liquid base material 205. As the composite sheet material 220 exits extrusion device 210, it typically is carried along a conveyor 223, cooled or otherwise allowed or forced to harden, and then cut to the desired length. One or more rollers 225 also may be used for additional shaping and/or for facilitating the cooling process of the composite sheet material 220 that is produced by extrusion device 210.

According to the present embodiment of the present invention, where a fabric material 207 is being used to produce the composite sheet material 220, the fabric material preferably is fed through the extrusion die and/or underneath the roller 225 together with the liquid or semi-liquid non-fibrous base material 205, so that the resulting material 220 has the desired composite composition. Preferably, the fabric material 207 is inserted underneath the liquid or semi-liquid non-fibrous base material 205, so that once the non-fibrous base material 205 hardens, the desired composite sheet of material 220 will result.

Figure 12:
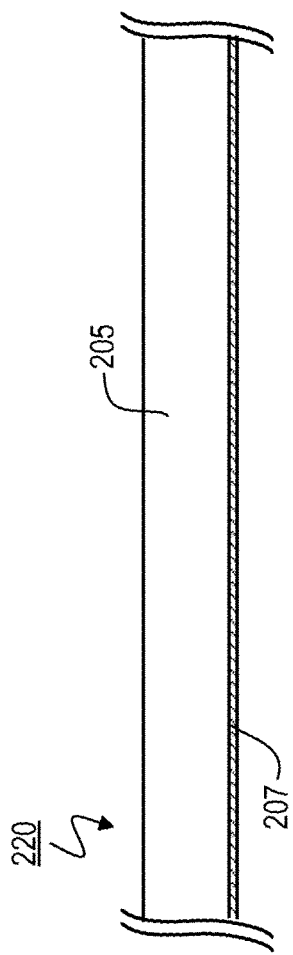
FIG. 12 illustrates a sectional view of a sample composite sheet material according to the first representative embodiment of the present invention.

In the foregoing embodiment, fabric sheet material 207 is embedded into a preferably non-fibrous material 205. An example of the resulting composite sheet material 220 is illustrated in FIG. 12. As shown, the top layer of composite sheet material 220 is made of the base material 205, and the bottom layer consists largely of the fabric sheet material 207, with the layer of base material 205 ordinarily being significantly thicker than the layer of fabric sheet material 207.

Figure 13:
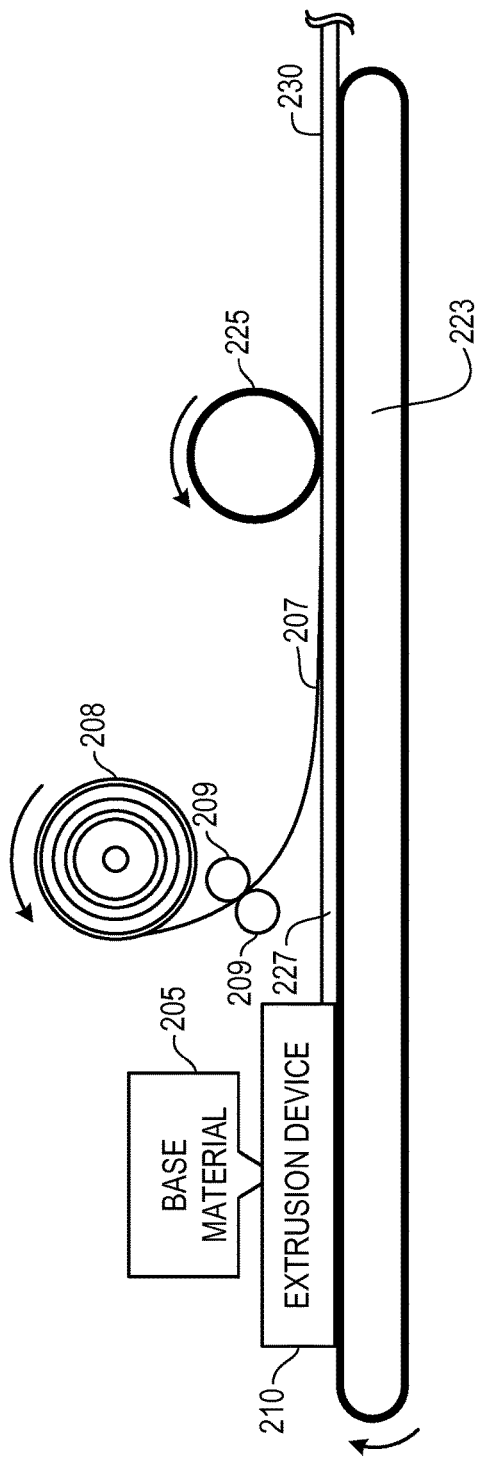
FIG. 13 is a right side conceptual view of a system for making a composite sheet material according to a second representative embodiment of the present invention.
Figure 14:
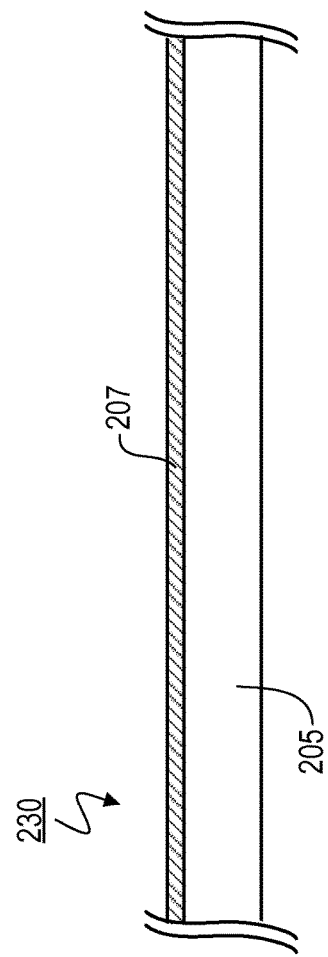
FIG. 14 illustrates a sectional view of a sample composite sheet material according to the second and third representative embodiments of the present invention.

However, in alternate embodiments, the sheet of fabric material 207 is pressed onto the non-fibrous base material 205 after the non-fibrous base material 205 has exited the extrusion die and/or roller 225 and is still in a liquid or semi-liquid state, i.e., in an uncured state. One example of this is shown in FIG. 13. In this embodiment, the sheet of fabric material 207 is laid onto an extruded sheet 227 made entirely of base material 205 only after the base material 205 has exited extrusion device 210. According to one sub-embodiment, extruded sheet 227 is approximately 6-7 millimeters (mm) thick. Thereafter, fabric material 207 is pressed into the surface of extruded sheet 227 using roller 225, thereby forming composite sheet material 230. According to one sub-embodiment, composite sheet material 230 is approximately 4-5 mm thick. As shown in FIG. 14, the composite sheet material 230 has a bottom layer of base material 205 and a thinner top layer into which the fabric material 207 has been embedded.

Figure 15:
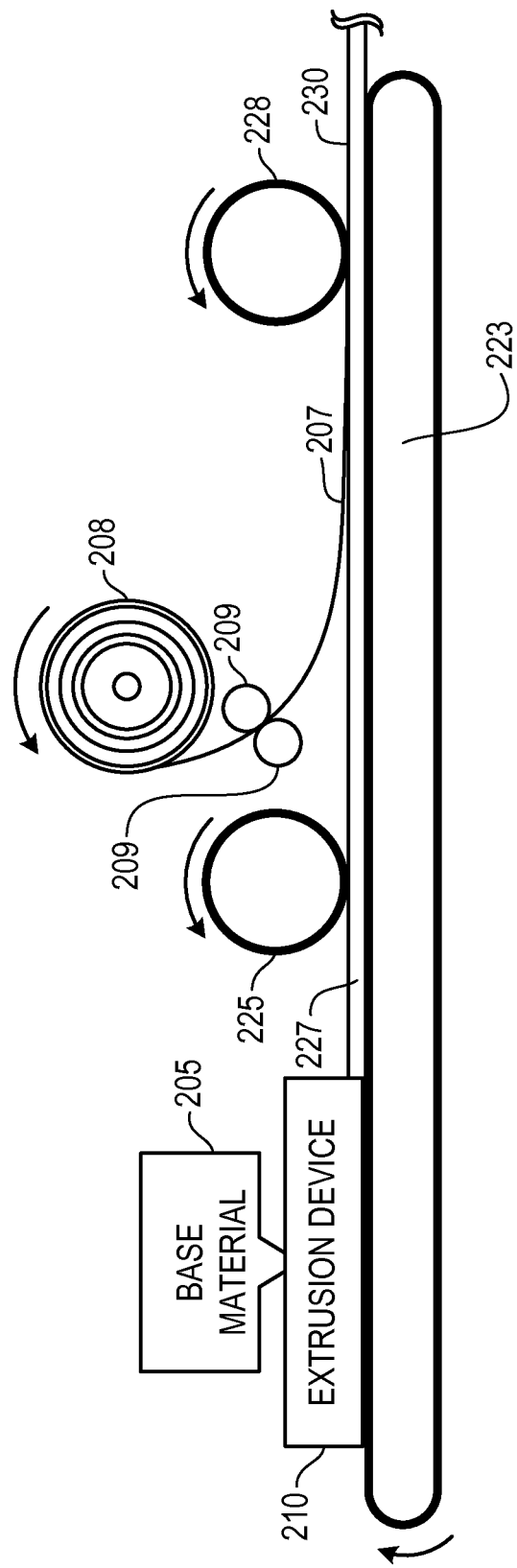
FIG. 15 is a right side conceptual view of a system for making a composite sheet material according to a third representative embodiment of the present invention.

FIG. 15 illustrates another of the embodiments noted above. Here, the extruded sheet 227 of base material 205 first passes underneath roller 225, e.g., for shaping and/or cooling. Only after that is the sheet of fabric material 207 laid on top of extruded sheet 227 and then pressed into sheet 227 by roller 228. However, essentially the same composite sheet material 230 results from this process as resulted from the preceding process. In certain sub-embodiments, extruded sheet 227 is approximately 6-7 mm thick, and composite sheet 230 is approximately 4-5 mm thick.

Alternate embodiments use individual fibers, rather than a sheet of fabric material 207, in a technique similar to that described above. In still further embodiments where individual fibers are to be embedded into the non-fibrous material 205, the fibers may be pre-mixed together with the liquid or semi-liquid base material 205.

Thus, in certain embodiments, individual fibers are sprinkled or sprayed, during the shaping process or afterward (e.g., on the conveyor belt before the non-fibrous material has hardened or has fully hardened). For example, in one representative embodiment where two or more consecutive rollers are being used, the fibers are sprinkled or sprayed between the rollers. Such an embodiment might be implemented where, for example, only one side of the resulting composite sheet material is desired to have a composite surface, and/or one wishes to be sure that the individual fibers form a significant part of the surface area for the resulting composite sheet.

Figure 16:
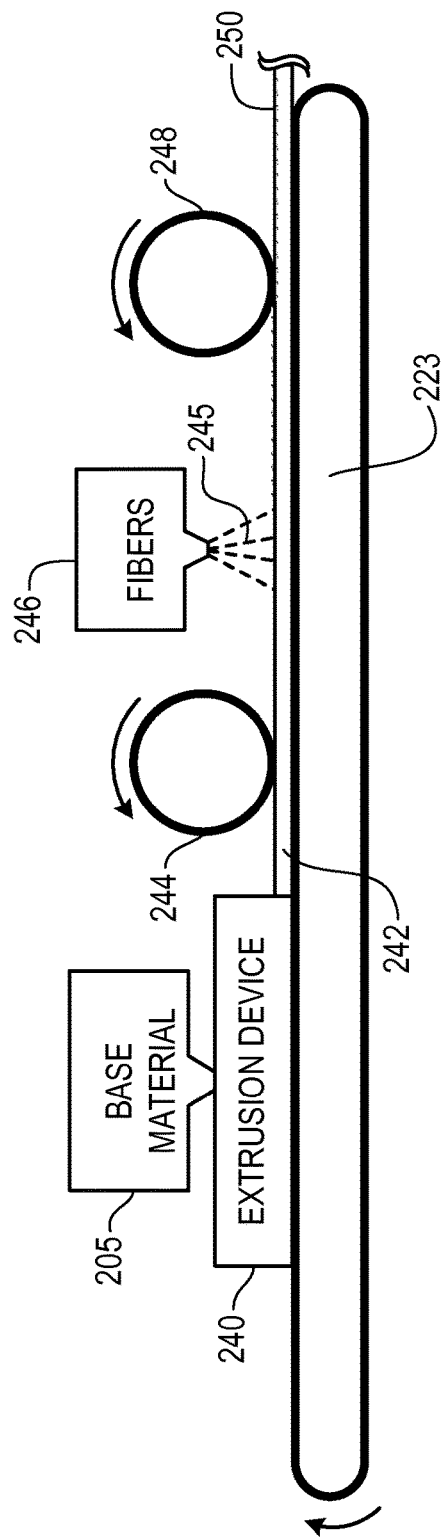
FIG. 16 is a right side conceptual view of a system for making a composite sheet material according to a fourth representative embodiment of the present invention.

An example of such a technique is shown in FIG. 16. Here, a sheet 242, consisting only of base material 205, is extruded by extrusion device 240. Accordingly, this portion of this embodiment is identical to certain conventional extrusion techniques. A first roller 244 then smooths and/or partially cools sheet 242. Thereafter, a number of individual fibers 245 (or, in certain alternate embodiments, other particles, preferably particles of natural materials) are deposited onto the upper surface of sheet 242 by device 246. In this regard, device 246 may be implemented, e.g., as a sprayer or as a sifter. One example of the latter is a container with a sieve for a lower surface, where the container is shaken or vibrated in order to cause the fibers 245 to the sprinkled down onto the surface of sheet 242.

Figure 17:
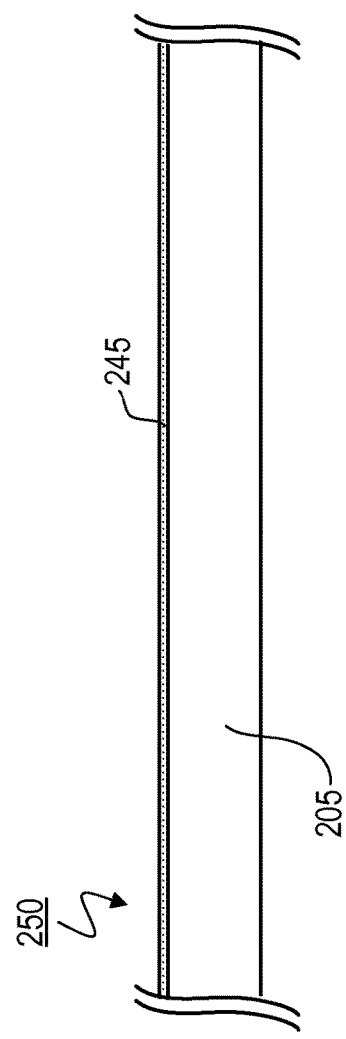
FIG. 17 illustrates a sectional view of a sample composite sheet material according to the fourth representative embodiment of the present invention.

Finally, roller 248 presses the fibers 245 into the surface of sheet 242, resulting in a composite sheet 250, and in some cases simultaneously providing additional cooling. As shown in FIG. 17, sheet 250 has a lower layer that is formed of base material 205 and a thinner upper layer that has fibers 245 embedded within it. In certain sub-embodiments, extruded sheet 242 is approximately 6-7 mm thick, and composite sheet 250 is approximately 4-5 mm thick.

Figure 18:
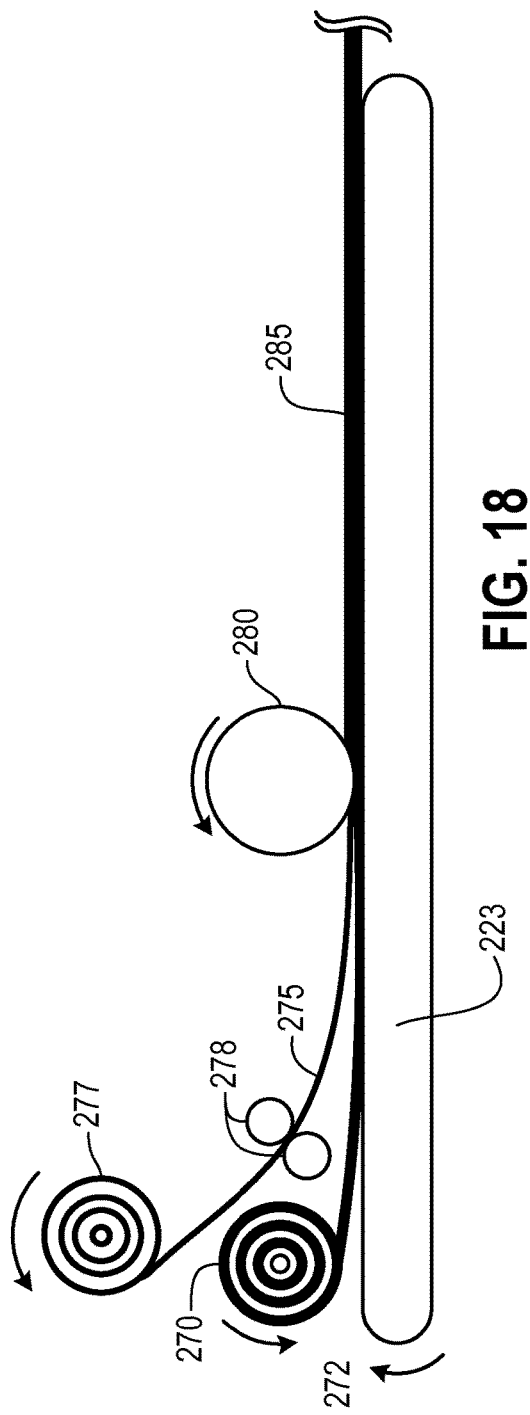
FIG. 18 is a right side conceptual view of a system for making a composite sheet material according to a fifth representative embodiment of the present invention.
Figure 19:
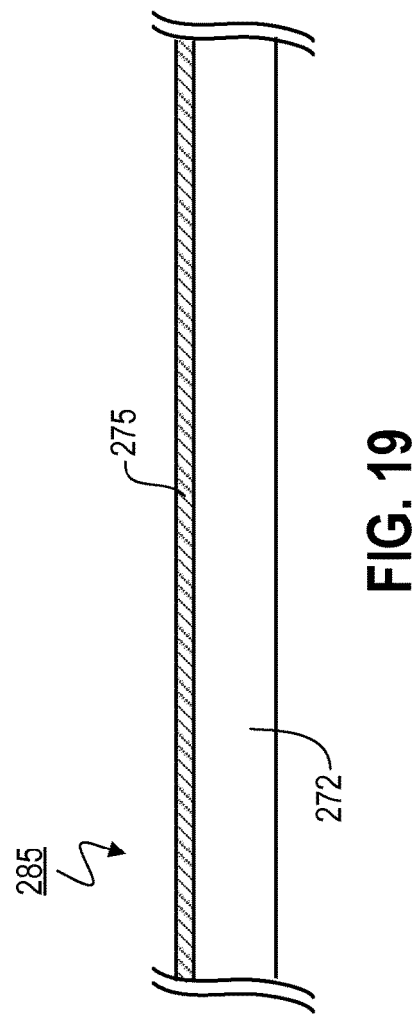
FIG. 19 illustrates a sectional view of a sample composite sheet material according to the fifth representative embodiment of the present invention.

The second general class of embodiments contemplated by the present invention involves the impression of a plurality of individual fibers or a sheet of fabric material into the surface of a pre-manufactured sheet of non-fibrous material. An example is illustrated in FIG. 18.

Preferably, a roll 270 of such pre-manufactured non-fibrous base sheet material 272 (e.g., made from any of the types of base material 205 mentioned above) is first obtained. For example, such sheet material 272 might have been previously fabricated using a conventional extrusion process. A sheet of fabric material 275 (e.g., drawn from a roll 277) is placed on one side (typically the upper side) of the non-fibrous material 272 (e.g., using guiding rollers 78), and the combination of the base sheet material 272 and the fabric sheet material 275 is passed underneath one or more heated rollers 280, which apply heat and pressure, partially melting the surface of the non-fibrous material 272 and causing the fabric material 275 to embed into it, resulting in composite sheet material 285.

A similar technique can be applied by coating the non-fibrous sheet of material with individual fibers (instead of fabric sheet material) and then passing the combination underneath heated rollers 280. Still further, depending upon the type of the non-fibrous sheet material 272, chemical or radiation techniques may be utilized to temporarily soften the surface of the non-fibrous material so that the sheet of fabric material or individual fibers can be embedded into it, or even pressure alone can be used to embed the fibrous material (e.g., fabric sheet material 275 or individual fabric fibers) into the non-fibrous material 272.

In any of the embodiments discussed above, the extrusion die and/or any of the rollers may result in relatively flat surfaces for the resulting sheet material or instead may be shaped so as to form or impress a three-dimensional pattern, such as a tread pattern for embodiments in which the resulting composite sheet material is to be used in a shoe outsole.

Also, in alternate embodiments the fabric or fibrous materials described above may be replaced by various other kinds of materials. For example, sheets or individual particles of leather, reconstituted leather, cork, paper, corn husks, hemp, other organic materials that have long fibers (e.g., for the purpose of adding strength to the finished product for wear improvement), any other plant material, or any other natural or synthetic material (or mixture of materials, such as a composite compound or mixture of organic materials) may be embedded into a sheet of base material 205 or otherwise used to form a composite sheet material using any of the techniques described above.

In some of the embodiments described above, the rollers provide a cooling effect. In other embodiments, e.g., where other types of materials such as one where natural or synthetic rubber is used, the rollers may be heated in order to effect or assist in curing.

Still further, although the embodiments described above contemplate a single layer of fabric or fibers in a single layer of base material 205, in alternate embodiments, multiple (e.g., alternating) layers of such materials may be used. In order to produce a composite sheet material or a finished article having such multiple layers, the techniques described above may be repeated, or individual composite sheets may be joined together, e.g., by gluing, using a vulcanization process or in any of a variety of other ways.

Generally speaking, in the foregoing embodiments only a single side of the non-fibrous base material is embedded with fibrous material. However, in alternate embodiments both sides of the non-fibrous base material are embedded with fibrous material, which may be the same on both sides or different fibrous materials may be used for the two different sides.

In any event, once a sheet of composite material has been manufactured in accordance with any of the foregoing techniques, it can be cut into any desired shapes and used for any desired purpose. As noted above, one such purpose is to fabricate the outsole of a shoe. Thus, as shown in FIG. 20, a pair of entire shoe outsoles 300 has been cut from a sheet of composite material 302. Alternatively, one or more portions of a shoe's outsole may be cut from composite sheet material 302 and used in fabricating a shoe's outsole, e.g., by combining such portion(s) with other elements. For instance, in one such embodiment, pieces of a shoe's outsole cut from composite sheet material are attached to a larger section of the shoe's outsole using a vulcanization process.

It is noted that the selection of the fibrous and non-fibrous materials for use in the methods of the present invention preferably depends upon the desired characteristics of the resulting composite material. Although certain specific examples of materials have been provided above, any other materials instead may be used.

Additional Considerations

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention are to be considered as within the scope thereof as limited solely by the claims appended hereto.

What is claimed is:

1. A shoe comprising:
   (a) a bottom surface that is adjacent to the ground in normal use;
   (b) a sole that forms at least a portion of the bottom surface;
   (c) an upper portion extending above the sole; and
   (d) a plurality of individual particles bonded to the bottom surface of the shoe,
   wherein the individual particles comprise corn husk.

2. A shoe according to claim 1, wherein the corn husk has been ground into the individual particles.

3. A shoe according to claim 2, wherein the corn husk has been dried and ground into the individual particles.

4. A shoe according to claim 1, wherein at least 1,000 of the individual particles are bonded to the bottom surface of the shoe.

5. A shoe according to claim 1, wherein the individual particles are bonded to the bottom surface of the shoe using a separate adhesive material.

6. A shoe according to claim 1, wherein the individual particles have been bonded to the bottom surface of the shoe by embedding the individual particles directly into said bottom surface.

7. A shoe according to claim 6, wherein said embedding is performed by using at least one of heat and pressure.

8. A shoe according to claim 1, wherein the individual particles have been bonded directly onto the bottom surface of the shoe.

9. A shoe according to claim 1, wherein the individual particles are attached to a substrate and the substrate has been bonded onto the bottom surface of the shoe.

10. A shoe according to claim 1, wherein the individual particles cover at least 50% of the portion of the bottom surface that normally comes into contact with the ground.

* * * * *